(No Model.) 2 Sheets—Sheet 1.
G. R. McGINNIS.
CORN PLANTER.
No. 426,947. Patented Apr. 29, 1890.
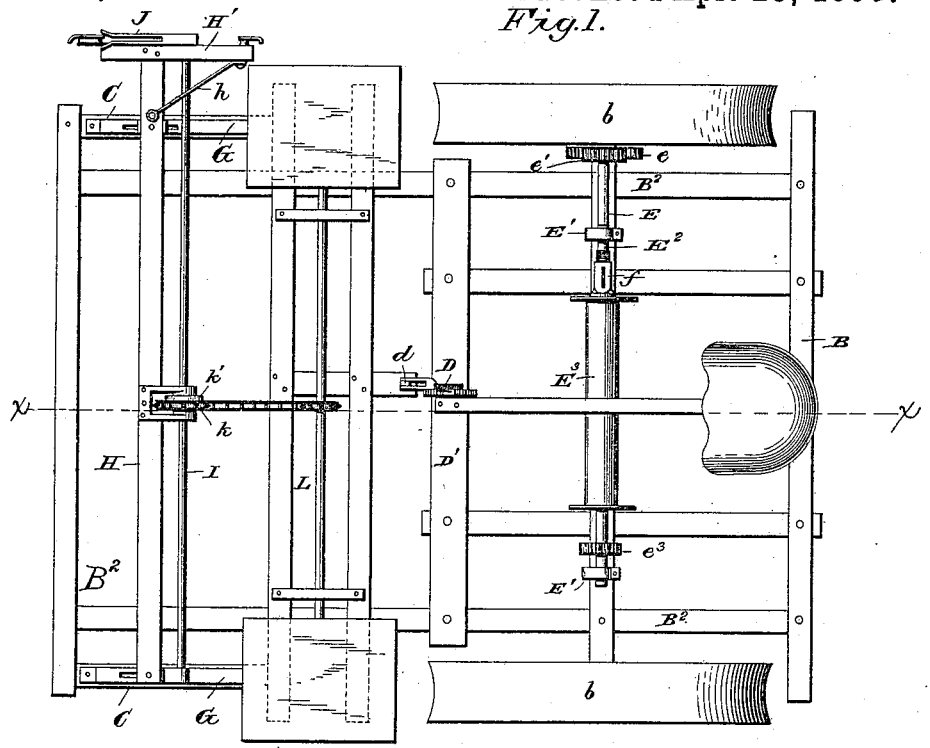
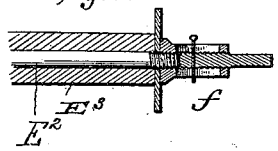
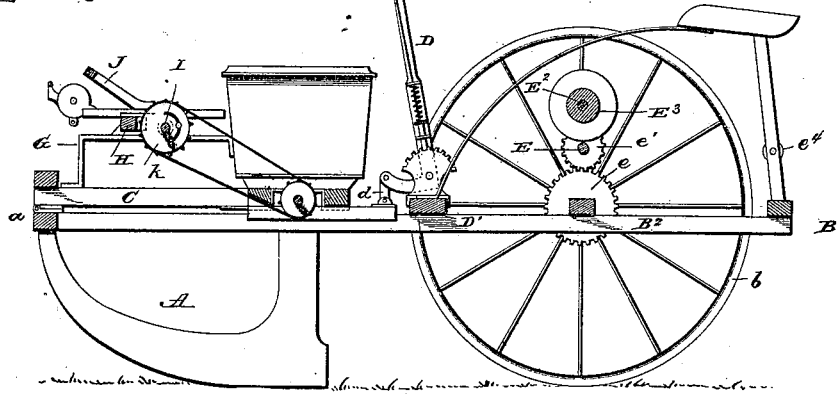
Witnesses
G. S. Elliott
E. W. Johnson
George R. McGinnis
Inventor
By his Attorney (No Model.) 2 Sheets—Sheet 2.
G. R. McGINNIS.
CORN PLANTER.
No. 426,947. Patented Apr. 29, 1890.
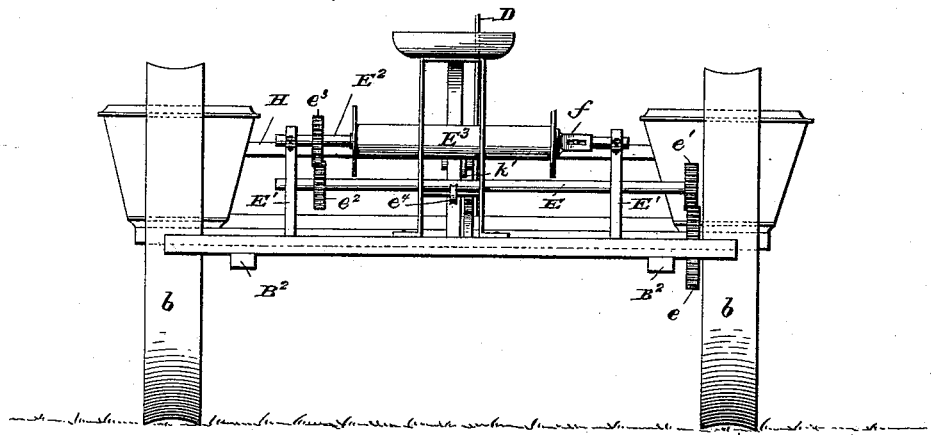
Fig. 3.
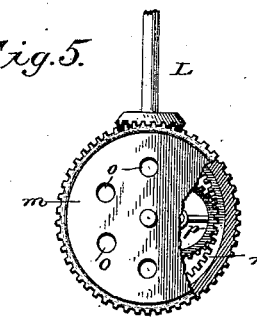
Fig. 4. Fig. 5. Fig. 6.
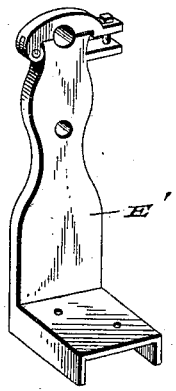
Fig. 7.
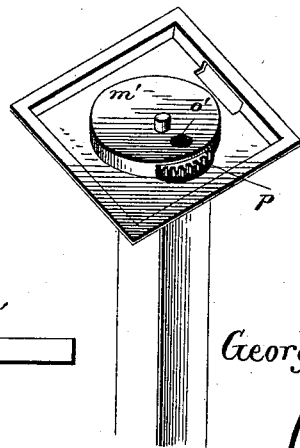
Fig. 8.
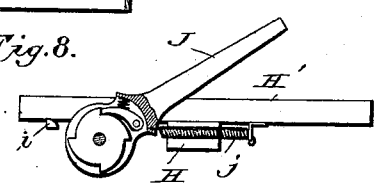
George R. McGinnis.
Inventor
Witnesses
G. S. Elliott
E. W. Johnson
By his Attorney

UNITED STATES PATENT OFFICE.

GEORGE R. McGINNIS, OF CISCO, ILLINOIS.

CORN-PLANTER.

SPECIFICATION forming part of Letters Patent No. 426,947, dated April 29, 1890.

Application filed December 12, 1889. Serial No. 333,459. (No model.)

*To all whom it may concern:*

Be it known that I, GEORGE R. MCGINNIS, a citizen of the United States of America, residing at Cisco, in the county of Piatt and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in check-row corn-planters.

The object of the invention is to provide a check-row corn-planter with means whereby the shaft which operates the seed-droppers can be properly and readily adjusted with respect to the arm with which the check-row cord engages, and also in mounting a reel near the rear end of the planter, upon which the check-row cord can be wound and unwound; and the invention consists in the special construction and combination of the parts, as will be hereinafter fully set forth and particularly claimed.

In the accompanying drawings, Figure 1 is a plan view of a corn-planter embodying my invention. Fig. 2 is a longitudinal section on line $xx$, Fig. 1. Fig. 3 is a rear view. Fig. 4 is a vertical sectional view through one of the seed-boxes and seed-spouts. Figs. 5, 6, 7, and 8 are detail views. Fig. 9 is a detail sectional view showing one end of the reel and its shaft, together with the tension devices for said reel.

A refers to the runners of the front frame, which are secured to a transverse beam $a$ and extend upwardly at their rear ends, where they are secured to the frame upon which are mounted the seed-boxes. The rear frame B, upon which is mounted a transverse axle carrying covering-wheels $b$, is provided with forwardly-projecting beams $B^2$, the front ends of which are provided with hinges which form means for connecting these beams to the beams C of the upper and front frame carrying the seed-dropping mechanism, and near the rear portion thereof the seed-boxes are located. The frame C is provided with a central beam which extends rearwardly, and by means of a link $d$ it is connected to the forward end of a lever D, said lever being pivoted to a casting mounted upon the front transverse beam D' of the rear wheel-carrying frame B. By means of this construction the heels of the runners A may be elevated or depressed, so that the furrows which are opened thereby will be of a greater or less depth, as may be desired. The casting to which the lever D is pivoted has a curved upper portion with teeth, with which a spring-actuated pawl carried by the lever engages.

One of the supporting and covering wheels $b$ of the rear frame B has a cog-wheel $e$ rigidly attached thereto, with which meshes a pinion $e'$, mounted adjacent thereto upon a shaft E, supported in suitable bearings or uprights E'. At the opposite end of the shaft E is a pinion $e^2$, which meshes with a similar pinion $e^3$, mounted on a shaft $E^2$, which carries a drum or cylinder $E^3$, upon which the check-row cord is adapted to be wound. This cylinder $E^3$ is loosely mounted on the shaft $E^2$, and said shaft at one side has a collar, against which one of the ends or heads of the cylinder bears, while the opposite end is adapted to engage with a follower $f$, which is internally screw-threaded to engage with the threads formed on the enlarged portion of the shaft $E^2$. This threaded portion of the shaft is provided with a longitudinal slot, the sleeve $f$ also being slotted, so that when the sleeve or follower is turned to contact against the head of the drum the drum will be held securely in place, or the friction may be such that the drum will only turn when a certain amount of power is applied to the periphery thereof.

The upper end of each of the shaft-supports E' is provided with a covering-plate and securing-bolt, as shown in Fig. 6, so that the desired degree of friction or tension can be given to the shaft by tightening or loosening the bolts.

The check-row cord is adapted to be wound upon the drum and also paid out therefrom, and beneath the rear seat-support is journaled a guide-roller $e^4$, over which the check-row cord passes.

Beneath the shaft $E^2$, and within its supports E', is journaled a shaft E, carrying two gear-wheels, one of which meshes with the gear-wheel upon the shaft $E^2$, while the other engages a gear-wheel $e$, attached to one of the supporting-wheels. It will therefore be observed that the shaft upon which the drum is mounted can be moved to one side, so that it may be thrown out of gear with the shaft beneath when desired.

At the front portion of the frame C are secured supports or castings G, which extend from the side beams of the front frame upwardly and rearwardly, where the ends are attached to the adjacent seed-box, and both of these frames are provided with longitudinal slots, through which pass bolts attached to the transverse beam H, which carries at one end a beam H', upon which is mounted a forked arm operated by the check-row cord in the usual manner. This beam H' has a brace $h$ for holding the same rigid. The beam H is also provided with journals or supports for a shaft I, upon one end of which is rigidly mounted a ratchet-wheel, over which loosely plays the forked lever J, having a spring-pawl which engages with the teeth of the ratchet-wheel. This forked lever is adapted to be moved in one direction by the check-row cord and is retracted by a spring $j$, which is rigidly attached to a downwardly-projecting portion of the beam H'. The forward movement of the forked lever is limited by a projection $i$, which not only contacts with the portion of the lever which embraces the ratchet-wheel, but also with the pawl, thus preventing the pawl becoming disengaged at the limit of movement by the shock occasioned by the sudden stoppage of the forked lever and the releasing of the button on the check-row cord.

The shaft I, which is rotated by the ratchet-wheel and forked lever J, is provided centrally with a sprocket-wheel $k$, which is loosely mounted on said shaft, said sprocket-wheel having a semicircular slot or opening, through which passes a headed bolt, said bolt being adapted to engage with a plate or disk $k'$, fixed or rigidly secured upon the shaft I, so that when the bolt is loosened the sprocket-wheel may be adjusted so that the seed will drop as may be desired, or in unison with the forward or rearward movement of the forked lever. The shaft I is suitably supported centrally by a properly-constructed hanger, which may be made as shown. A chain connects the sprocket-wheel $k$ with a sprocket-wheel upon the shaft L, and at the end of this shaft are beveled pinions, which mesh with a gear-wheel $m$, provided exteriorly with beveled cogs and interiorly with straight or vertical teeth $n$, with which the vertical seed-drop is geared.

The gear-wheel $m$, hereinbefore referred to, has a series of openings $o\ o$, and beneath said wheel $m$ is located a plate having a single opening $o'$, one edge of the depending portion of this plate being cut away, so that the pinion $p$ can engage with the teeth $n$ of the gear-wheel $m$. It will be observed by this construction that as the shaft L is rotated the pinion fixed thereon will cause the rotation of the gear-wheel $m$, and as the perforations in the upper portion thereof pass over the plate $m'$ the seed will pass through the opening $o'$ therein and drop into the seed-spout between the rear portion thereof, which is provided with a hinged door A' and one of the segments of the grooved stirrer.

The planter, as hereinbefore described, can be readily adjusted by loosening a single bolt and adjusting the sprocket-wheel so that the seed may drop, as may be desired, either upon the forward or rearward movement of the forked lever with which the check-row cord engages.

I claim—

1. In a check-row corn-planter, the combination, with the supporting-frame, of a transverse shaft located at the front thereof and carrying the forked levers at each end, a disk or plate rigidly secured on said shaft, a sprocket-wheel adjustably bolted thereto, seed hoppers and dropping devices located in the rear of said front shaft, and a second shaft operating the same and geared to the sprocket-wheel of the front shaft, substantially as set forth.

2. In a check-row corn-planter, the combination, with the main frame, of a second frame above the same and pivotally connected thereto at its front end, parallel shafts mounted in said upper frame, geared together, and the forward one carrying forked levers and the latter having gear-pinions to operate the seed-dropping devices, hoppers located at each side near the rear end of said upper frame and provided with seed-dropping devices, and a lever mounted on the main frame and connected to the rear end of the upper frame, substantially as set forth.

3. In a corn-planter, the combination of the longitudinal beams $B^2$, a frame C, carrying the adjustable check-row cord-operated mechanism, seed-boxes, and runners, said frame being mounted upon and hinged at its forward end to the front ends of the beams $B^2$, and a lever D, located upon and carried by the beams $B^2$ and provided with a link $d$ for connecting the same to the rear portion of the frame C, substantially as and for the purpose set forth.

4. In a corn-planter, the combination, with the adjustable check-row cord-operated mechanism, seed-boxes, and runners, of the supporting-wheels $b$, mounted on an axle, one of said wheels carrying a cog-wheel $e$, and brackets E', having journals for shafts, one of which carries at one end a gear-wheel $e'$ and at its opposite end a pinion $e^2$, which engages with a pinion located on the shaft above, which is supported in the journals located in the upper ends of the brackets E', said brackets having hinged plates and tightening-bolts, for the purpose set forth.

5. In a corn-planter provided with the check-row cord-operated mechanism, seed-boxes, and runners, a device for winding check-row cords, consisting of a drum loosely mounted on a shaft, said shaft having an enlarged threaded portion and a longitudinal slot, and a sleeve internally threaded to engage with the threaded portion of said shaft and correspondingly slotted, so that said sleeve may be moved against one end of the drum and locked on the shaft, substantially as shown.

6. In a check-row corn-planter, the combination of a main frame, a second frame above the same and pivotally connected to the same at its front end, horizontally-slotted brackets at each side, and a shaft carrying forked levers adjustably bearing therein, seed-hoppers located at the rear of said hinged frame and having seed-dropping devices, a second shaft geared to the first and operating said dropping devices, together with a lever on the front frame for adjusting the hinged frame, substantially as set forth.

In testimony whereof I affix my signature in presence of two witnesses.

GEORGE R. McGINNIS.

Witnesses:
AARON V. IVENS,
GEORGE HOTT.